United States Patent [19]

Ward et al.

[11] 3,965,734
[45] June 29, 1976

[54] PRESSURE EQUALIZING LOAD CELL SYSTEM

[75] Inventors: Howard E. Ward, Tustin; Mari A. Wolf, El Toro, both of Calif.

[73] Assignee: Joy Manufacturing Company, Pittsburgh, Pa.

[22] Filed: Feb. 19, 1975

[21] Appl. No.: 551,226

[52] U.S. Cl. ............................................. 73/141 A
[51] Int. Cl.² ........................................... G01L 1/26
[58] Field of Search ............. 73/141 R, 141 A, 393, 73/395

[56] References Cited
UNITED STATES PATENTS

| | | | |
|---|---|---|---|
| 2,275,532 | 3/1942 | Lamberger et al. | 73/88.5 R |
| 2,639,616 | 5/1953 | Tate | 73/393 X |
| 3,097,536 | 7/1963 | Young | 73/141 R |
| 3,168,826 | 2/1965 | Paetow | 73/141 A |

FOREIGN PATENTS OR APPLICATIONS 757,211   9/1956   United Kingdom............... 73/141 A

*Primary Examiner*—Charles A. Ruehl

[57] ABSTRACT

A load cell system which is adapted to equalize the pressure on opposite sides of a load cell protective jacket in order to prevent erroneous force measurements which may otherwise result.

3 Claims, 2 Drawing Figures

PRESSURE EQUALIZING LOAD CELL SYSTEM

A load cell is a transducer which can sense an applied force such as a tension, compression, or bending, and translate the applied force into a directly proportional electrical signal. In use, a test element is secured to a load cell to measure the force applied to that element in, for example, a water tunnel or wind tunnel. In many applications the force applying environment may be harmful, for example, an environment corrosive to the force-sensing members of the load cell. In these circumstances it is customary to enclose the force-sensing members in a hermetically sealed jacket. However, it has been found that if for any reason the internal pressure of this jacket differs from the pressure of the surrounding environment, the resultant pressure differential will produce a net force on the jacket which will be sensed by the force-sensing members as an applied force. In this case the resulting electrical signal will not accurately represent the true applied force on the element being tested. In systems where the pressure of the environment of the load cell fluctuates rapidly, such as where the load cell environment is being pressurized or evacuated, it may be extremely difficult to obtain reliable load cell readings because of the difficulty involved in accurately identifying, and compensating for, the force component caused by the pressure differential.

The instant invention eliminates the above described problem by equalizing pressure differentials between the interior and exterior of a load cell jacket while still providing the force-sensing members with protection from a harmful environment.

Figure 2:
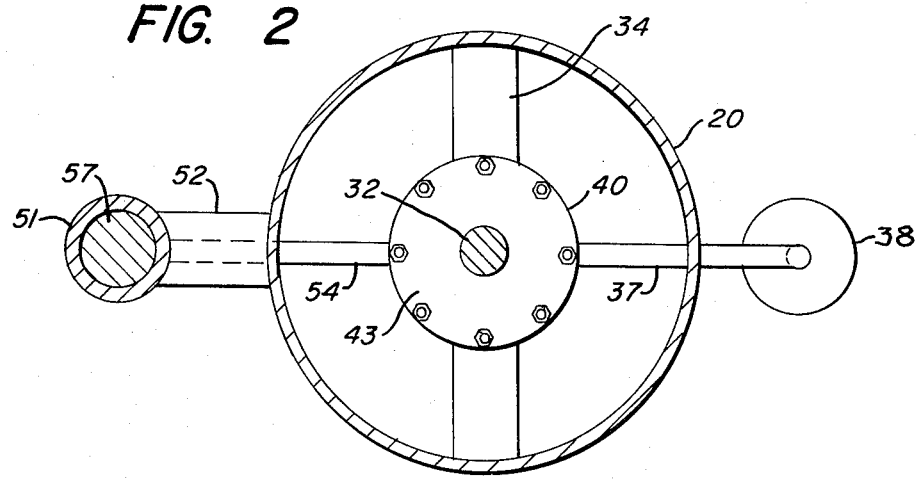
Figure 1:
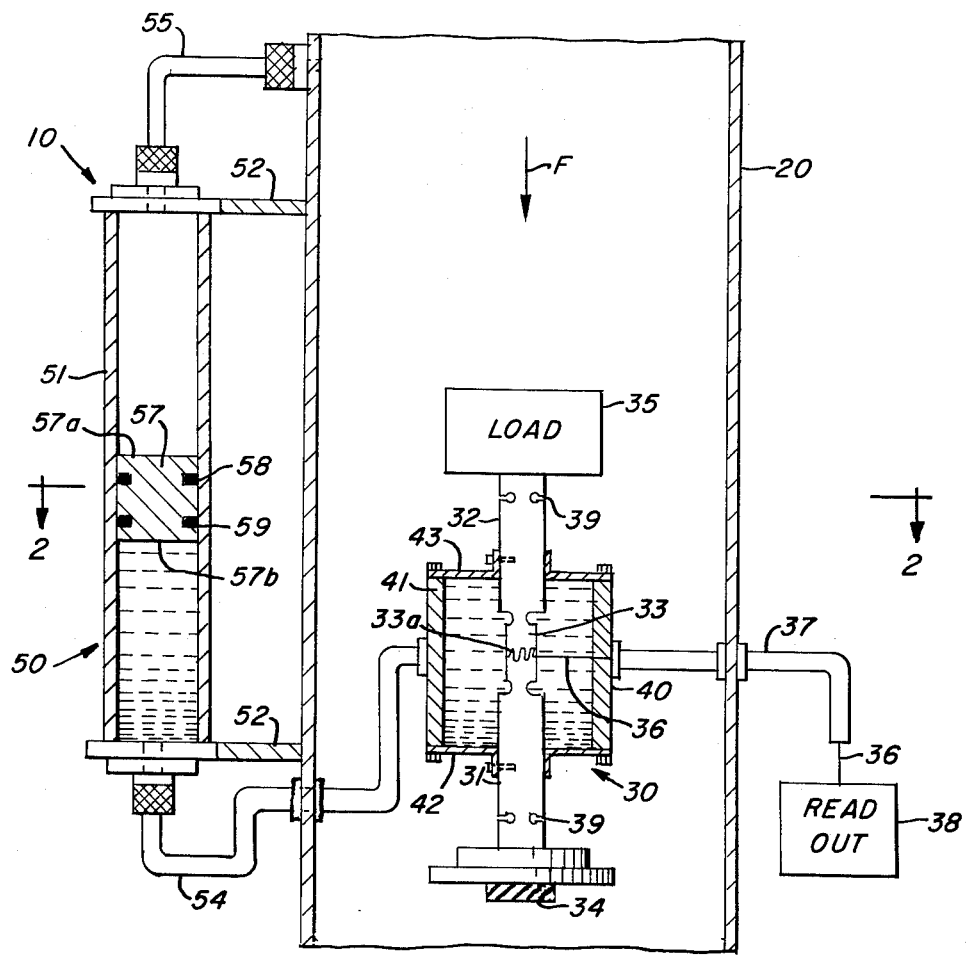

A preferred embodiment of the invention will be described in detail with reference to the drawings wherein:

FIG. 1 is a schematic representation, partly in section, of the pressure equalizing load cell system constructed in accordance with the principles of this invention; and FIG. 2 is a view of the load cell system of FIG. 1 taken along line 2—2 of FIG. 1.

In the figures there is shown a pressure equalizing load cell assembly generally indicated at 10 and operative in an environment, shown as a water tunnel 20, in a manner to be described hereinafter. The assembly 10 generally includes a load cell 30 carried within tunnel 20 and a pressure equalizing means 50 cooperable with an isolated portion of load cell 30 to equalize the pressure within such isolated portion with the pressure within tunnel 20. The load cell 30 is of any suitable configuration and as shown comprises a ground end portion 31, a load end portion 32 axially spaced from portion 31 and a force-sensing portion 33 axially intermediate portions 31 and 32.

As shown, the ground end 31 of load cell 30 is rigidly mounted inside water tunnel 20 by a suitable strut 34 while the load end 32 carries a test element or load 35. Connected to the force-sensing portion 33 is a suitable electrical connection 36 which leads through the wall of water tunnel 20 within conduit 37 to a conventional read-out device 38. Each end portion contains flexures 39 which enable the force-sensing portion to measure only the axial force on load 35.

Load cell 30 functions in a well known manner by measuring the force imparted to end portion 32 by load 35 which is subjected to a force F in the water tunnel 20. The applied force is detected by suitable strain gauges 33a on the force-sensing portion 33 which generate and transmit an electrical signal proportional to the detected force to read-out 38 via line 36 where the signal may be measured and recorded. For further information concerning the operation of conventional load cells reference is made to U.S. Pat. Nos. 3,088,083 and 3,205,706.

In practice load cell 30 may be utilized in an environment which may be destructive to operating components thereof, particularly the force-sensing portion 33 and the strain gauges carried thereon. Accordingly, is common practice to provide means to isolate the force-sensing portion 33 from the potentially damaging external environment. An example of such an isolation means is illustrated as jacket 40 which envelopes the force-sensing portion 33 and seals portion 33 from the environment within water tunnel 20. The jacket 40 preferably comprises a cylindrical tubular casing 41 and annular end diaphragms 42 and 43 sealingly attached to respective ends of the casing 41 and to respective end portions 31 and 32 of the load cell. Since end portion 32 may move toward or away from end portion 31 on the order of 0.002 to 0.010 inch under the force exerted on load 35, it is necessary that the diaphragms 42 and 43 be of sufficient flexibility so as not to exert a retarding force on this movement. A suitable material for diaphragms 42 and 43 has been found to be thin gauge steel. It is noted that while it is preferred that both ends of jacket 40 comprise flexible diaphragms a single flexible diaphragm will produce satisfactory results.

Jacket 40 has proved to be adequate environmental protection for portion 33; however, in the use of such an arrangement it has been found that if the internal pressure within jacket 40 differs from the pressure within the water tunnel 20, this pressure differential will act on diaphragms 42 and 43 to produce a force which will be imparted to end portions 31 and 32 and be sensed by the force-sensing portion 33 as an applied force. In this case the resulting electrical signal sent to read-out 38 will not accurately represent the true applied force imparted to the load 35. In order to prevent erroneous force signals the pressure on both sides of diaphragms 42 and 43 is equalized by employing the pressure equalizing means 50 which will now be described in detail.

As illustrated pressure equalizing means 50 comprises a cylindrical fluid tight chamber 51 having pressure lines 54 and 55 communicating therewith adjacent respective axial end portions thereof. The chamber 51 is suitably secured to water tunnel 20 such as by brackets 52. Pressure line 54 communicates with chamber 51 adjacent the lower end thereof and extends therefrom through the wall of water tunnel 20 into communication with the interior of jacket 40. Pressure line 55 communicates with chamber 51 adjacent the upper end thereof and extends therefrom into communication with the internal environment within water tunnel 20. A non-corrosive liquid, preferably an oil, is maintained within jacket 40, pressure line 54 and the lower end portion of chamber 51. The upper end of chamber 51 will contain the fluid within the water tunnel due to the communication thereof with the water tunnel 20 via pressure line 55. Piston 57 is slidably contained within chamber 51 and includes annular low friction Teflon seals 58 and 59 to provide a freely movable barrier between the water tunnel environment in the upper end portion of chamber 51 and the oil in the lower end portion of chamber 51. It is noted that a flexible diaphragm could be used in place of the piston 57; and if the fluid of the environment would not physically mix or chemically react with the oil within the load cell jacket, it would not be necessary to provide a piston or diaphragm within the chamber 51 since the fluid-oil interface formed therein would not require a separating barrier.

In operation, a fluid is caused to flow in water tunnel 20 in the direction of the arrow and this flow will impart an applied force F to load 35. This force will be sensed by the strain gauges 33a on the force-sensing portion 33 and an electrical signal will be sent via line 36 to the read-out device 38 in a well known manner. The fluid within the water tunnel freely communicates with chamber 51 and the fluid-piston interface 57a via pressure line 55. Since piston 57 freely moves within chamber 51 such communication renders the pressure exerted on the oil within the chamber 51 at the oil-piston interface 57b equal at all times to the pressure of the fluid within the water tunnel. The pressure exerted on the oil-piston interface 57b is in turn transmitted through the oil in pressure line 54 to the interior of jacket 40 where the pressure of the oil will be maintained equal to the pressure within the water tunnel. Thus, the pressure exerted on the interior surface of diaphragms 42 and 43 will always be equal to the pressure exerted on the exterior of the diaphragms; however, due to the fact that the water tunnel fluid cannot pass through the chamber 51, the force-sensing portion 33 will not be exposed to the harmful water tunnel fluid. It can be seen that the invention provides a system which is self-regulating and instantaneously responsive to pressure changes of the load cell environment. Since the pressure on both sides of the jacket is maintained equal, the load cell incorporated in this novel system will provide accurate force signals to read-out device 38 while still maintaining its force-sensing portion 33 fully protected from the fluid of the load cell environment.

It should be noted that the volume enclosed by jacket 40 may increase or decrease a very small amount due to the slight flexing of the annular end diaphragms 42 and 43 as they follow end portions 31 and 32. It can readily be seen that such flexing will in no way effect the pressure equalization produced by the instant invention but will merely cause the piston 57 to move up or down slightly; or in the case of a pistonless embodiment as described above the fluid-oil interface will move up or down slightly.

Notwithstanding the reference hereinabove to a particular embodiment of the present invention, it is to be understood that this invention may be practiced in various other embodiments with numerous modifications thereto without departing from the spirit and scope thereof. For example: a pressure tank could be used in place of a water tunnel as the environment of the load cell; the chamber could be positioned within the environment of the load cell; the pressure line from the jacket could be connected to the upper portion of the chamber and the pressure line from the environment connected to the lower portion of the chamber a constant diameter tube could be substituted for the chamber and pressure lines; the chamber could be of a configuration other than a straight tube.

What is claimed is:

1. A load cell assembly comprising: an elongated load cell mounted within a fluid environment and having a force-sensing portion intermediate the ends thereof; enclosure means on said load cell spaced from and surrounding said force-sensing portion for forming a sealed enclosure therearound and containing a non-corrosive fluid therein; said enclosure means including at least one flexible diaphragm sealingly secured to said load cell for allowing slight relative movement between the ends of said load cell; and pressure equalizing means in fluid communication with such environment and the interior of said enclosure means for equalizing the pressure on each side of said diaphragm and for preventing the fluid of such environment from entering said enclosure means; said pressure equalizing means including an elongated chamber having a piston slidable therein forming within said elongated chamber two variable volume fluid chamber portions, a first pressure line communicating said non-corrosive fluid between said enclosure means and one of said chamber portions, a second pressure line communicating the fluid of such environment with the other of said chamber portions.

2. A load cell assembly as specified in claim 1 wherein said enclosure means includes two flexible diaphragms sealingly secured to respective end portions of said load cell and said pressure equalizing means equalizes the fluid pressure on each side of both said diaphragms.

3. A load cell assembly as specified in claim 1 wherein said at least one diaphragm is a steel diaphragm.

* * * * *

UNITED STATES PATENT OFFICE
CERTIFICATE OF CORRECTION

PATENT NO. : 3,965,734
DATED : June 29, 1976
INVENTOR(S) : Howard E. Ward and Mari A. Wolf It is certified that error appears in the above-identified patent and that said Letters Patent are hereby corrected as shown below:

Change the Assignee to:

Task Corporation
Anaheim, California

Signed and Sealed this

Eighteenth Day of October 1977

[SEAL]

Attest:

RUTH C. MASON
Attesting Officer

LUTRELLE F. PARKER
Acting Commissioner of Patents and Trademarks